United States Patent [19]

Biadigo et al.

[11] Patent Number: 4,553,920

[45] Date of Patent: Nov. 19, 1985

[54] AUTOMATIC MACHINE FOR THE FETTLING OF THE SYPHON OF SANITARY APPLIANCES

[75] Inventors: Mario Biadigo, Milan; Gianfranco Zucchi, Brescia, both of Italy

[73] Assignee: Ideal Standard S.p.A., Milan, Italy

[21] Appl. No.: 511,997

[22] Filed: Jul. 8, 1983

[30] Foreign Application Priority Data

Jul. 9, 1982 [IT] Italy .............................. 46842 A/82

[51] Int. Cl.⁴ .......................... B29C 25/00; B44D 5/10

[52] U.S. Cl. .................................. 425/267; 51/33 R; 51/34 D; 51/34 H; 51/55; 425/218; 425/385; 425/445; 425/457; 425/459; 425/460

[58] Field of Search ............... 425/267, 459, 460, 457, 425/218, 90, 91, 92, 94, 340, 363, 383, 385, 445, 425/263, 265, 268; D32/1, 4; 901/11, 12, 16, 40, 41, 901/43; 51/34 D, 34 E, 34 H, 34 J, 31, 33 R, 55

[56] References Cited

U.S. PATENT DOCUMENTS

| | | | |
|---|---|---|---|
| 1,850,939 | 3/1932 | Miller | 425/268 |
| 2,137,306 | 11/1938 | Perazzoli | 51/34 E |
| 2,200,506 | 5/1940 | Kline | 51/34 E |
| 2,287,559 | 6/1942 | Nye | 51/34 D |
| 2,381,572 | 8/1945 | Caldwell | 51/34 D |
| 2,813,324 | 11/1957 | Watkin | 425/267 |
| 2,923,101 | 2/1960 | Johnson | 51/34 D |
| 3,404,490 | 10/1968 | Estabrook | 51/34 D |
| 3,670,456 | 6/1972 | Harratt | 51/34 D |
| 3,736,703 | 6/1973 | Estabrook et al. | 51/34 D |
| 4,233,491 | 11/1980 | Maruyama | 901/16 |

OTHER PUBLICATIONS

"Micromatic Microhoning and Microflat Equipment Catolog", Micromatic Hone Corp., Detroit, Mich.

"The Creeping Technology of Grinding and Fettling", McCormack et al., Decade of Robotics, 1983, pp. 48–51.

*Primary Examiner*—Jay H. Woo

*Assistant Examiner*—James C. Housel

*Attorney, Agent, or Firm*—Birch, Stewart, Kolasch & Birch

[57] ABSTRACT

An automatic machine for the fettling of the syphon of sanitary appliances, comprising a vertical flat structure of overall elastically deformable configuration, which tapers downwards in such a manner as to be able to be inserted into the syphons of the articles provided laterally with two fettling sectors arranged to contact the walls of the syphons, and which is supported by an operating head arranged to subject it to vertical reciprocating recitlinear motion and to simultaneous stepwise rotary motion; the operating head is mounted on a vertical slider for its positioning at the required level.

10 Claims, 4 Drawing Figures

AUTOMATIC MACHINE FOR THE FETTLING OF THE SYPHON OF SANITARY APPLIANCES

The present industrial invention patent relates to a machine arranged to automatically and accurately accomplish the fettling of the syphons of sanitary articles such as water closet pans.

Said fettling operation is known to involve the finishing of the visible surfaces of the syphon, in particular of its mouth which in substance constitutes the outlet of the appliance.

Fettling is effected manually shortly after the cast pieces have been removed from the mould, ie while they are still in the soft state, said operation being accomplished by the use of skeins or pads formed from a weave of filiform plastics material commonly known as SCOTCH BRITE.

It should also be noted that the fettling of the syphon is a very delicate operation in that it must absolutely respect the configuration of the visible mouth of the syphon, in particular its rear wall and especially the lower edge thereof, because if said rear wall and lower edge undergo excessive removal of material, the seal of the corresponding syphon deteriorates.

The fettling personnel are thus compelled to carry out a large number of long, heavy, delicate, repetitive and/or monotonous operations.

The present patent provides and protects a machine arranged to obviate the aforesaid drawbacks in that it is able to automatically effect fettling of the syphons, by means of a simple, rational and extremely reliable constructional design.

According to the invention, the machine concerned comprises a vertical slider on which there is disposed in an overhanging manner, to lie above a mobile or fixed support surface on which the articles are arranged, a fettling tool driven with vertical reciprocating rectilinear motion and stepwise rotary motion, which reproduce the manual motion.

The fettling tool according to the invention comprises two elastically deformable flat articulated frames which lie vertically and are symmetrically disposed about the axis of rotation of the tool, their two outer elements being each provided with a profiled sheet of SCOTCH BRITE, of elongated shape.

These sheets are disposed so that they converge downwards in order to enable them to be easily inserted into the syphon mouths, and the respective articulated support frames are mobile towards and away from each other against suitable elastic means, so as to enable the active edges of the fettling sheets to adapt to the different transverse dimensions of said syphons.

For a better understanding of the characteristics and constructional merits of the invention, reference is made hereinafter to the figures of the accompanying drawings which illustrate a particular preferred embodiment by way of non-limiting example only.

Figure 1:
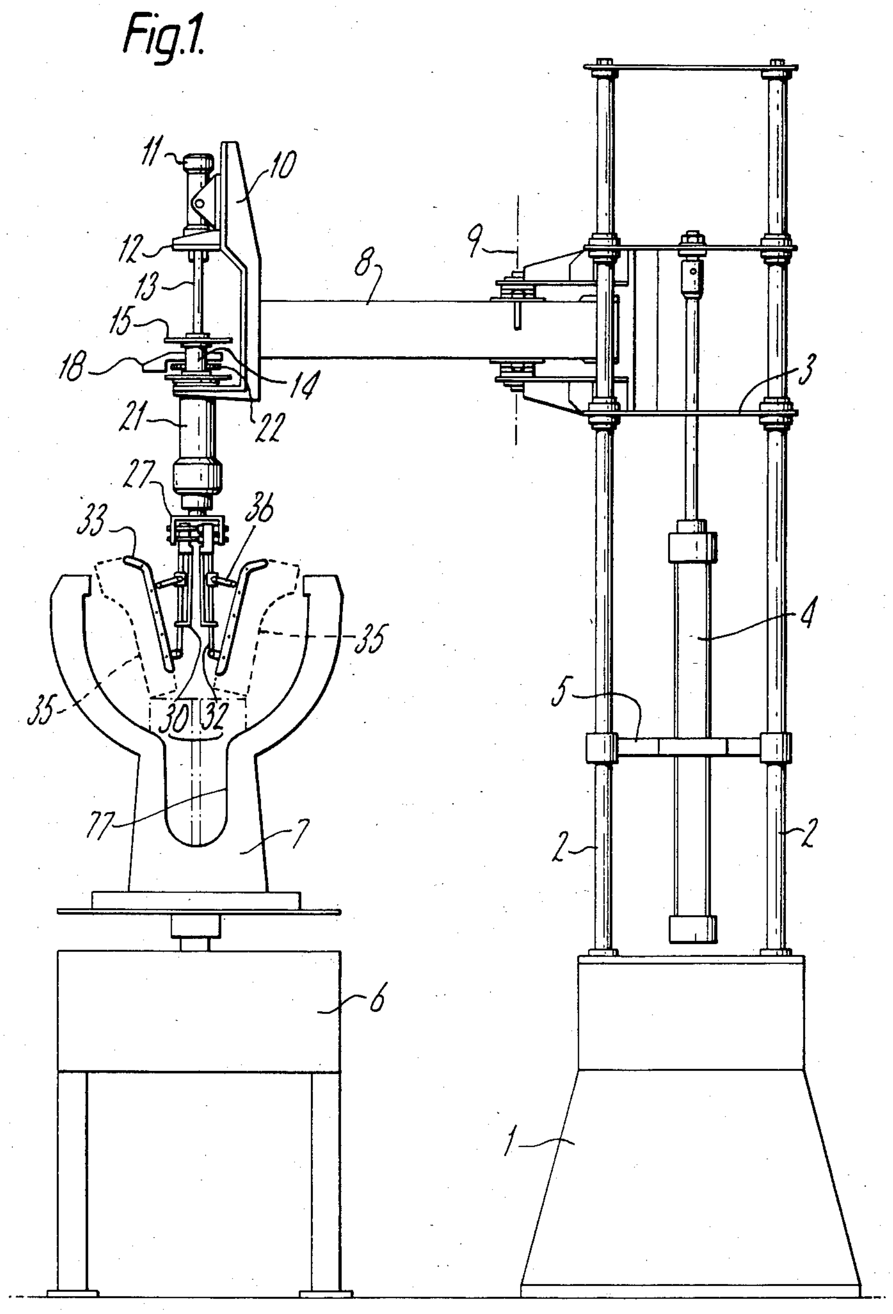
FIG. 1 is a side view of the invention.

Said figures, and in particular FIG. 1, show a base 1 from which there rise four guide columns 2 on which a slider 3 is vertically mounted.

This latter is controlled by a double acting hydraulic cylinder-piston unit 4, which lies between the columns 2, by which it is supported by way of a lower transverse support 5.

To the side of this structure there is a bench 6 on which the articles 7 of which the syphon is to be fettled, and in this specific case water closet pans, are disposed by way of suitable supports.

The illustrated bench 6 is of fixed type, but it is apparent that it can be mobile, for example can be constituted by a conveyor belt or a line of suitable trollies.

Moreover, according to the invention, a bench or surface 6 of fixed type can be provided, and the structure 1 can be autonomously mobile parallel thereto, which can be achieved by the usual means readily conceivable by experts of the art.

On that side which faces the bench 6, the slider 3 comprises a horizontal arm 8 hinged to said slider 3 on a vertical axis 9.

In this manner, the arm 8 and thus the fettling tool which it supports at its free end, can be swivelled in a horizontal plane in order to lie parallel to the bench 6 and outside it, to prevent undesirable or damaging interference between the articles and the fettling tool.

In order to ensure correct operational positioning of the arm 8, a suitable locking device, not shown in the figure, for example a latch, is provided.

Figure 2:
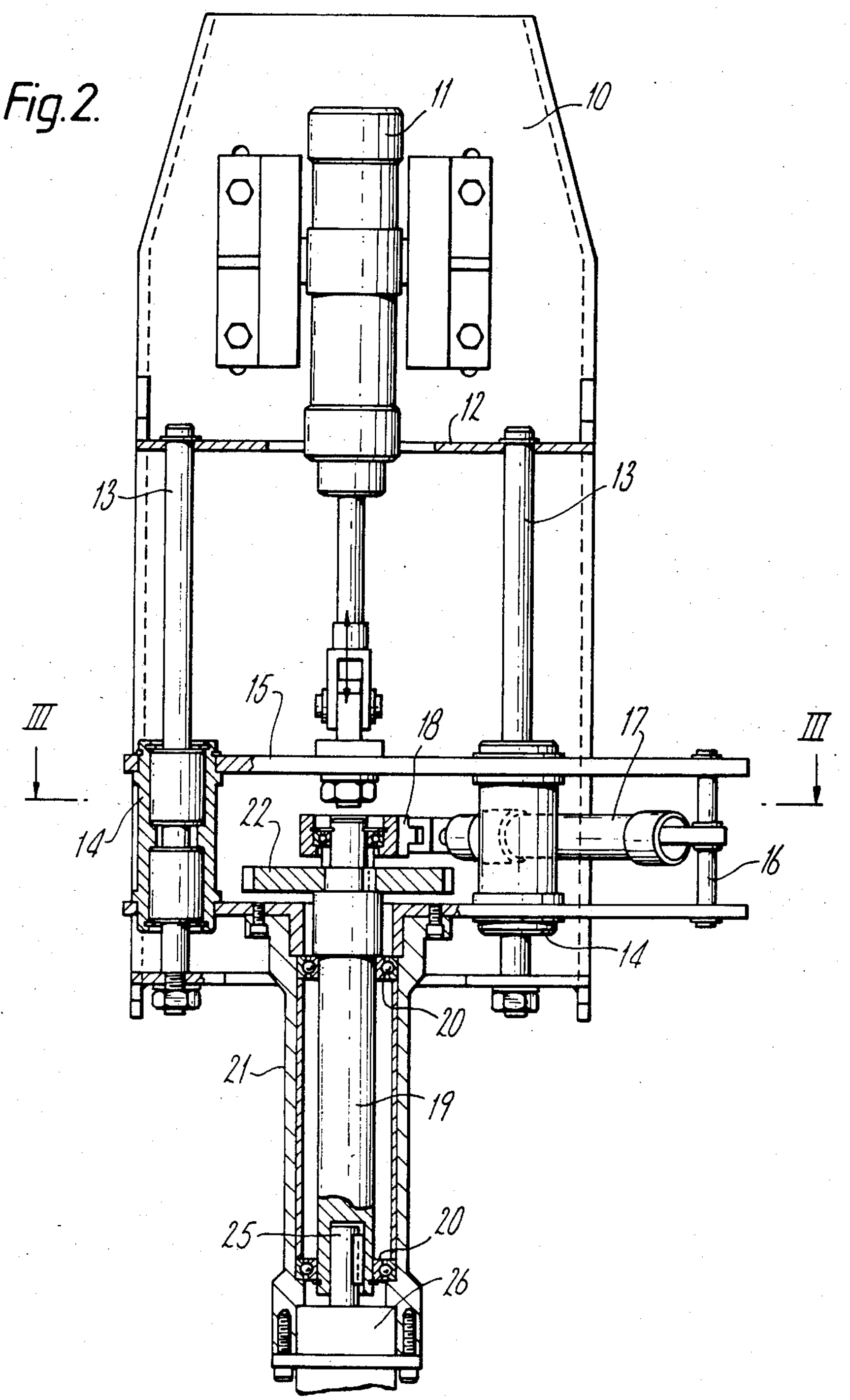
FIG. 2 is a partly sectional front view of the control head for the fettling tool.

The free end of the swivel arm 8 is provided with a bracket-shaped support 10, to the vertical element of which there is hinged, on a horizontal axis, a vertically-lying double acting hydraulic cylinder-piston unit 11, as also shown in FIG. 2.

Between the horizontal element of the bracket-shaped support 10 and an overlying parallel ledge 12, there are fixed two cylindrical guide bars 13 on which a vertical slide 15 is mounted by way of suitable slide bushes 14.

This vertical slide 15 is driven with vertical reciprocating rectilinear motion by the unit 11 to cause the fettling tool to involve the entire depth of the syphon 77 of the articles 7.

Figure 3:
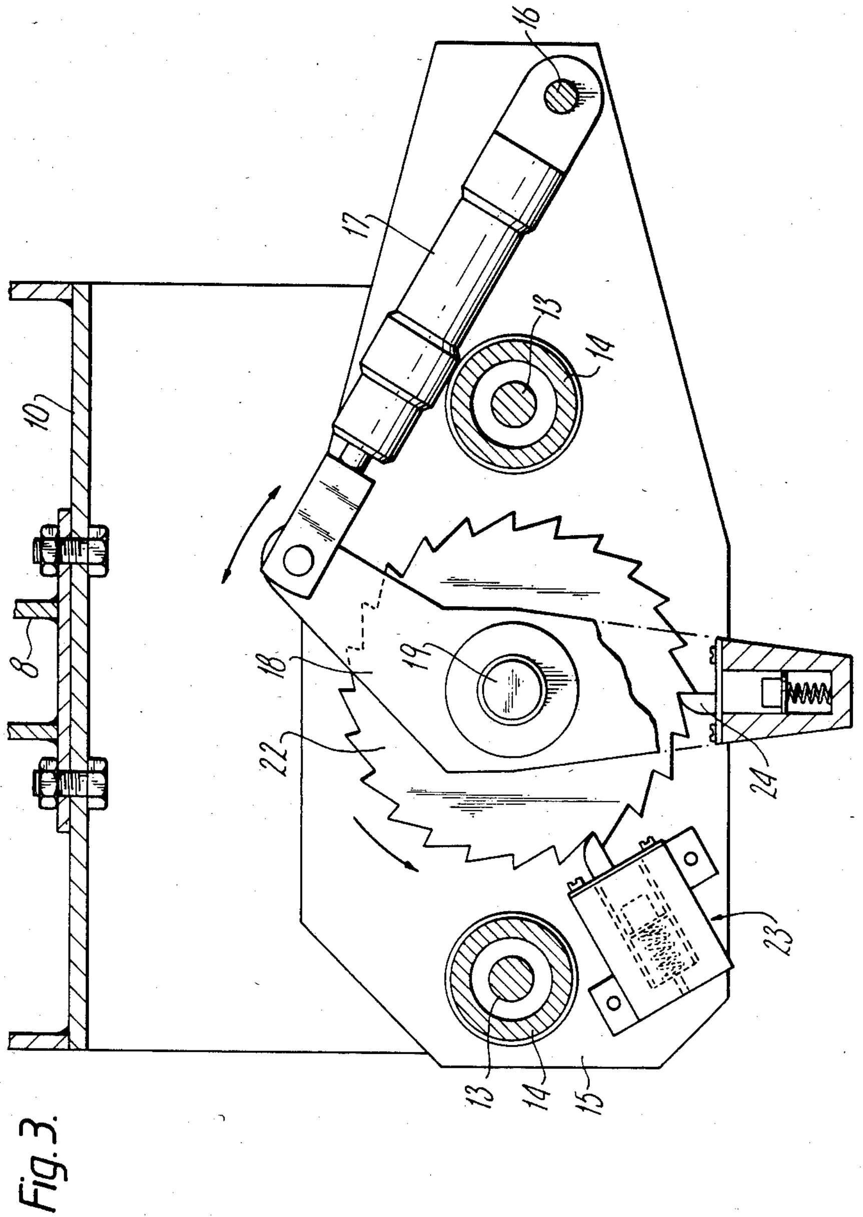
FIG. 3 is a section on the line III—III of FIG. 2.

As is clearly shown in the accompanying FIGS. 2 and 3, the slide 15 comprises two profiled plates fixed to the opposing ends of the slide bushes 14, and extending so that they project laterally from the bars 13 where they carry a vertical hinge pivot 16 for a horizontal double acting hydraulic cylinder-piston unit 17.

The rod of this latter horizontal double acting hydraulic cylinder-piston unit 17 is hinged to one end of a profiled rocker lever 18 which is rotatably mounted at the top of a vertical control shaft 19.

In its turn, the shaft 19 is rotatably mounted, by way of suitable end bearings 20 (FIG. 2), in a bush 21 which is fixed below the slide 15.

Between the two component plates of the slide 15 and below the rocker arm 18, there is fixed on the shaft 19 a sawtoothed ring gear 22 against which a normal non-return device 23 of ratchet type is constantly elastically urged, as best shown in FIG. 3.

From the same figure it can be seen that the other end of the rocker lever 18 lowerly comprises an enlargement which extends downwards to become disposed to the side of the toothing of the ring gear 22, and houses a tooth 24 for driving this ring gear 22.

The tooth 24 is also of the ratchet type as in the case of the nonreturn device 23.

In this manner, during the operational stages of the machine in question, the fettling tool is subjected to a rotary stepwise movement which takes place simultaneously with the aforesaid vertical reciprocating rectilinear motion.

Figure 4:
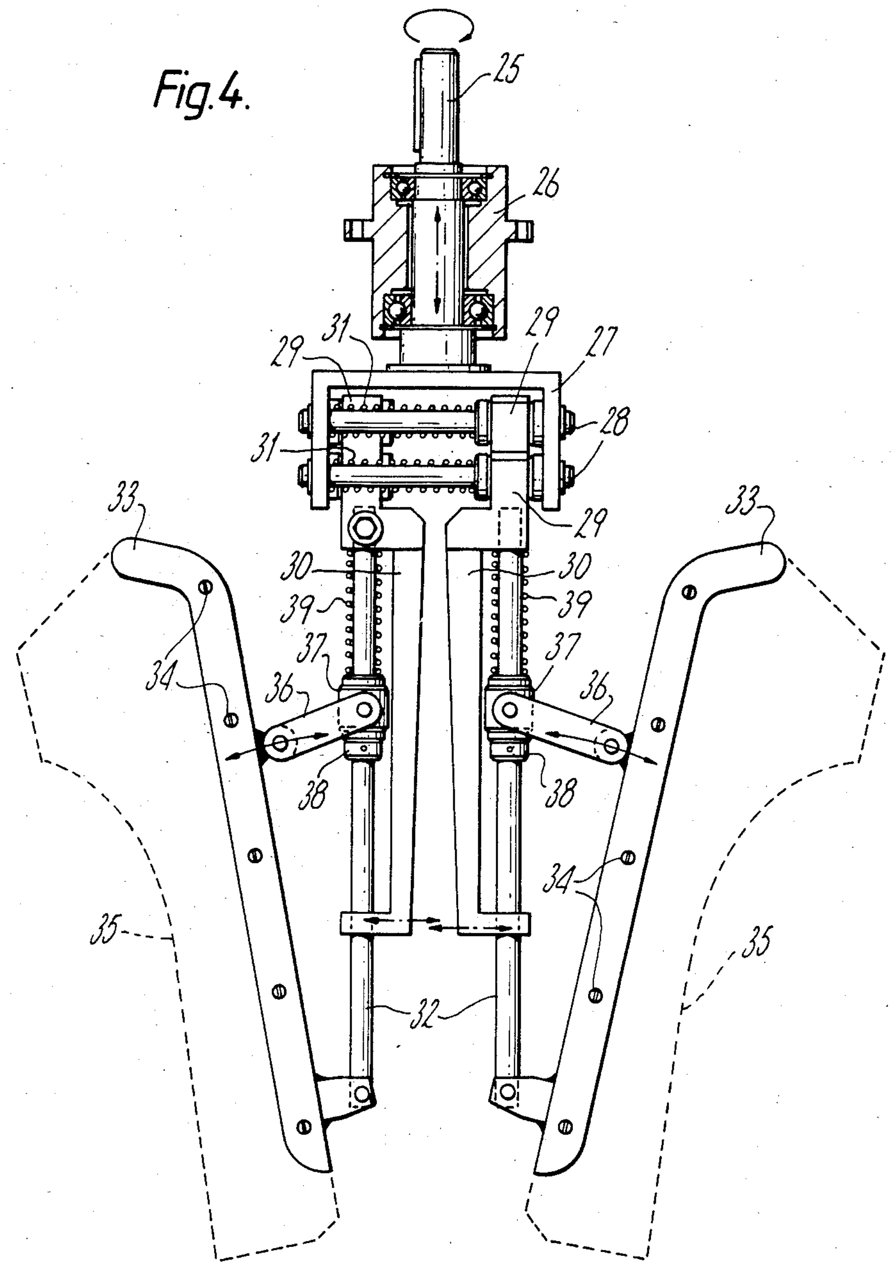
FIG. 4 is a vertical elevation of the fettling tool with which the machine is provided.

FIGS. 2 and 4 show that the lower end of the control shaft 19 has fixed to it a coaxial pin 25 which is rotatably mounted in a sleeve 26, this latter being fixed to the base of the bush 21.

The pin 26 comprises a lower fork 27, on the arms of which there are fixed two opposing pairs of horizontal superposed cylindrical rods 28.

A profiled arm 30, which extends vertically downwards, is slidably mounted on each pair of rods 28 by way of respective sleeves 29 (FIG. 4).

From one end of the first pair of rods 28 and from the opposite end of the second pair there are mounted respective compression springs 31 which keep the profiled arms 30 constantly urged towards the arms of the fork 27, as shown in FIG. 4.

Because of the two different vertical planes in which said two pairs of rods 28 lie, the respective profiled arms 30 can move towards or away from each other and can also lie in superposed relationship to a greater or lesser extent, so that the fettling tool can adapt to the various transverse dimensions of the mouth of the syphon 77.

On that outer zone of the profiled arm 30 which faces the corresponding arm of the fork 27 there is fixed a vertical cylindrical bar 32 which extends below the respective profiled arm 30, where a lever 33 is hinged thereto.

This latter extends upwards until it practically reaches the level occupied by the connection points of the arms 30, where it then bends outwards.

Moreover, the lever 33 extends below the point at which it is hinged to the respective bar 32.

In addition, the two levers 33 normally converge downwards (FIG. 4), both when at rest and during operation.

On one face of each lever 33 there is fixed by means of a set of screws 34 an identically configured plate for the clamping of a layer of SCOTCH BRITE 35 of the same shape as the lever 33.

The width of said layer 35 is greater than that of the lever 33, and said layer extends beyond the lower end of said lever 33.

To the upper part of this latter there are hinged two rear connecting rods 36 which terminate in a respective bush 37 slidably mounted on the corresponding bar 32.

For each bush 37 there is provided a lower stop ring 38 adjustable along the bar 32.

Finally, on the upper part of this latter, ie that lying between the connection point of the profiled arm 30 and the bush 37, there is mounted a compression spring 39.

The provision of these latter elements enables the active profiles of the layers 35 to adapt to the various orientations of the different lateral zones of the syphons 77, in order to correctly execute their fettling.

The operation and the use of the invention are clearly understandable from the aforegoing and from a simple examination of the accompanying figures.

We claim:

1. An automatic fettling apparatus for fettling the walls of a vessel comprising a slider means mounted for substantially vertical movement;

an operating head supported by said vertical slider;

a downwardly extending, articulated structure connected to said operating head;

frame members attached to said articulated structure, said frame members being laterally deformable to contact the walls of the vessel in which said articulated structure is to be inserted;

strips of a soft weave or mat of slightly abrasive filiform plastic material attached to said frame members;

first means operatively connected to said operating head and to said articulated structure to impart a vertical reciprocating rectilinear motion to said articulted structure; and second means operatively connected to said articulated structure to impart stepwise rotary motion, simultaneous with said vertical reciprocating rectilinear motion to said articulated structure.

2. The automatic fettling apparatus of claim 1 wherein the first means for imparting a vertical, reciprocating rectilinear motion to said articulated structure comprises:

a slide means;

a shaft rotatably mounted on said slide means;

a pin, coaxially disposed with respect to said shaft and connected to said articulated structure; and a double acting hydraulic cylinder piston unit secured to said operating head and controlling said vertical slide.

3. The automatic fettling apparatus of claim 1 wherein the second means for imparting the stepwise rotary motion comprises:

a rocker lever rotatably mounted at the top of said rotation shaft;

a double acting hydraulic cylinder-piston unit, the rod of said piston unit being hinged at one end of said rocker lever;

a ring gear fixed to said vertical rotation shaft;

a ratchet means urged against said ring gear; and a pawl for driving said ring gear, said pawl being mounted at the other end of said rocker level.

4. The automatic fettling machine of claim 1 wherein said articulated structure includes vertical support members; and means for moving said vertical support members toward and away from each other.

5. The automatic fettling machine of claim 4 wherein the frame members are mounted for vertical and rotational motion on said support members and pivotally connected to said vertical support members so as to conform to the walls of the vessel during the fettling operation.

6. The automatic fettling machine of claim 5 wherein the frame member is pivotally connected to said vertical support member by a connecting rod, one end of said connecting rod being connected to said support member and the other end thereof being connected to said frame member.

7. The automatic fettling machine of claim 6 wherein the support members are provided with spring biased bush members which are coaxially and slidably disposed on said support members, one end of said connecting rod being pivotally connected to said bush member, whereby when pressure is applied to said frame members, the bush members are forced to slide along the support members against said spring bias.

8. The automatic fettling machine of claim 4 wherein the vertical support members are slidably mounted on horizontal support members for moving said vertical support members toward and away from each other.

9. The automatic fettling machine of claim 8 wherein the vertical support members are mounted so as to be spring biased.

10. An automatic fettling machine of claim 1 further comprising a swivel arm, one end of said swivel arm being connected to said slider means and the other end thereof being connected to said operating head and arranged to support said operating head and move said articulated structure into and out of the zone occupied by the vessel.

* * * * *